(12) United States Patent
Miyahara et al.

(10) Patent No.: US 9,782,729 B2
(45) Date of Patent: Oct. 10, 2017

(54) CERAMIC SEPARATION MEMBRANE STRUCTURE, AND REPAIR METHOD THEREOF

(71) Applicant: NGK Insulators, Ltd., Nagoya (JP)

(72) Inventors: Makoto Miyahara, Nagoya (JP); Makiko Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 220 days.

(21) Appl. No.: 14/696,805

(22) Filed: Apr. 27, 2015

(65) Prior Publication Data

US 2015/0224451 A1 Aug. 13, 2015

Related U.S. Application Data

(63) Continuation of application No. PCT/JP2013/080366, filed on Nov. 1, 2013.

(30) Foreign Application Priority Data

Nov. 1, 2012 (JP) .................................. 2012-241958

(51) Int. Cl.
*B01D 39/00* (2006.01)
*B01D 39/16* (2006.01)
(Continued)

(52) U.S. Cl.
CPC ......... *B01D 71/028* (2013.01); *B01D 63/066* (2013.01); *B01D 65/108* (2013.01);
(Continued)

(58) Field of Classification Search
CPC ............ B01D 2253/108; B01D 71/028; B01D 2253/25; B01D 69/10; B01D 69/12; Y02C 10/08; C01B 2203/047
See application file for complete search history.

(56) References Cited

U.S. PATENT DOCUMENTS 5,968,366 A 10/1999 Deckman et al.
7,033,968 B1 4/2006 Bons et al.
(Continued)

FOREIGN PATENT DOCUMENTS

JP H07-155613 A 6/1995
JP H08-131786 A 5/1996
(Continued)

OTHER PUBLICATIONS

Extended European Search Report (Application No. 13851330.4) dated Jul. 5, 2016.
(Continued)

*Primary Examiner* — Ana Fortuna
(74) *Attorney, Agent, or Firm* — Burr & Brown, PLLC

(57) ABSTRACT

A ceramic separation membrane structure in which a zeolite separation membrane formed on a ceramic porous body is repaired, and a repair method thereof. In the ceramic separation membrane structure, a zeolite separation membrane is disposed on a ceramic porous body, and defects of the zeolite separation membrane are repaired by zeolite repaired portions containing zeolite of structure different from the structure of zeolite of the zeolite separation membrane. The zeolite separation membrane and the zeolite repaired portions are made of a hydrophobic zeolite having a ratio of $SiO_2/Al_2O_3 = 100$ or more.

9 Claims, 7 Drawing Sheets

(51) Int. Cl.
- B01D 67/00 (2006.01)
- B29C 44/04 (2006.01)
- B01D 71/02 (2006.01)
- C04B 38/00 (2006.01)
- B01D 65/10 (2006.01)
- B01D 69/04 (2006.01)
- B01D 63/06 (2006.01)
- C04B 111/00 (2006.01)

(52) U.S. Cl.
CPC .......... B01D 69/04 (2013.01); C04B 38/0006 (2013.01); *B01D 67/0048* (2013.01); *B01D 2321/28* (2013.01); *B01D 2321/32* (2013.01); *B01D 2325/12* (2013.01); *C04B 2111/00793* (2013.01)

(56) References Cited

U.S. PATENT DOCUMENTS

| | | | |
|---|---|---|---|
| 9,205,417 B2 * | 12/2015 | Miyahara | B01D 69/12 |
| 2006/0210472 A1 * | 9/2006 | Hastoy | B01J 29/035 |
| | | | 423/705 |
| 2008/0093008 A1 | 4/2008 | Isomura et al. | |
| 2008/0093291 A1 * | 4/2008 | Isomura | B01D 67/0048 |
| | | | 210/500.26 |
| 2009/0011926 A1 * | 1/2009 | Yajima | B01D 53/228 |
| | | | 502/62 |
| 2012/0000358 A1 | 1/2012 | Kawai et al. | |
| 2012/0074065 A1 | 3/2012 | Satou | |
| 2012/0272826 A1 * | 11/2012 | Uchikawa | B01D 53/228 |
| | | | 96/8 |
| 2014/0014574 A1 | 1/2014 | Teranishi et al. | |
| 2014/0021129 A1 | 1/2014 | Teranishi et al. | |
| 2015/0190755 A1 * | 7/2015 | Miyahara | B01D 63/066 |
| | | | 156/94 |
| 2015/0224451 A1 * | 8/2015 | Miyahara | C04B 38/00 |
| | | | 210/500.25 |

FOREIGN PATENT DOCUMENTS

| | | |
|---|---|---|
| JP | 2002-263457 A | 9/2002 |
| JP | 2003-238147 A | 8/2003 |
| JP | 2003-290636 A1 | 10/2003 |
| JP | 2004-083375 A | 3/2004 |
| JP | 2009-214075 A | 9/2009 |
| JP | 2010-506700 A | 3/2010 |
| JP | 2010-115610 A1 | 5/2010 |
| JP | 2010-247150 A | 11/2010 |
| JP | 2012-158718 A | 8/2012 |
| WO | 00/53298 A1 | 9/2000 |
| WO | 2008/050818 A1 | 5/2008 |
| WO | 2010/106881 A1 | 9/2010 |
| WO | 2011/105511 A1 | 9/2011 |
| WO | 2012/128217 A1 | 9/2012 |
| WO | 2012/128218 A1 | 9/2012 |

OTHER PUBLICATIONS

Den Exter, M.J., et al., "Separation of Permanent Gases on the All-Silica 8-Ring Clathrasil DD3R," *Studies in Surface Science and Catalysis*, vol. 84, 1994 (pp. 1159-1166).

English Translation of the Written Opinion of the International Searching Authority, International Application No. PCT/JP2013/080366, dated Dec. 10, 2013 (5 pages).

International Search Report (With English Translation) and Written Opinion, International Application No. PCT/JP2013/080366, dated Dec. 10, 2013 (4 pages).

* cited by examiner 33  34

CERAMIC SEPARATION MEMBRANE STRUCTURE, AND REPAIR METHOD THEREOF

BACKGROUND OF THE INVENTION

1. Field of the Invention

The present invention relates to a ceramic separation membrane structure in which a zeolite separation membrane formed on a ceramic porous body is repaired, and a repair method thereof.

2. Description of Related Art

In recent years, a filter made of ceramic material has been used to selectively recover only specific components from a multicomponent mixture (a mixed fluid). As compared with a filter made of organic polymer, the filter made of ceramic material is excellent in mechanical strength, durability, corrosion resistance and the like, and is therefore preferably applied to a water treatment or an exhaust gas treatment, or removal of suspended substances, bacteria, dust or the like in a liquid or a gas in a broad field such as a medical or food field.

As such filter, there is known a filter in which a zeolite membrane is formed on a ceramic porous body. When the zeolite membrane is formed on the ceramic porous body by hydrothermal synthesis, zeolite membranes can suitably be formed in most cells, however the presence of defects in some of the cells affected the quality as a product. When the hydrothermal synthesis is repeatedly performed to repair the defects, the membrane thickness of the portion other than the defects increases, and the permeation amount decreases.

In Patent Document 1, a method of repairing grain boundaries, cracks and pinholes of a zeolite membrane is disclosed. A coupling agent is brought into contact with one surface of the zeolite membrane and water is brought into contact with the other surface for the repair.

In Patent Document 2, a separation membrane disposed body is disclosed in which a sealing defect is less likely to be generated at a boundary portion between a separation membrane disposed on the surface of a porous substrate and a sealing portion. The boundary portion between the separation membrane and the sealing portion is provided with a coating zeolite.

In Patent Document 3, zeolite membranes are laminated to obtain a zeolite membrane having an excellent separation performance.

CITATION LIST

Patent Documents

[Patent Document 1] JP-A-2002-263457
[Patent Document 2] JP-A-2009-214075
[Patent Document 3] JP-A-2010-247150

SUMMARY OF THE INVENTION

Problem to be Solved by the Invention

When repair is performed by coating as in Patent Document 1, the durability is low. In addition, pores other than defects are closed and the permeation amount lowers.

In Patent Document 2, defects of a boundary portion between a separation membrane and a sealing portion are prevented. Repair of the defects of the separation membrane is not disclosed.

In Patent Document 3, the separation performance is improved, however zeolite membranes are laminated, and the permeation amount is likely to decrease when compared with a single layer.

An object of the present invention is to provide a ceramic separation membrane structure in which a zeolite separation membrane formed on a ceramic porous body is repaired, and a repair method thereof.

Means for Solving the Problem

The present inventors have found that the above object can be achieved by disposing zeolite repaired portions containing zeolite of structure different from the structure of the zeolite separation membrane. That is, according to the present invention, there are provided a ceramic separation membrane structure and a repair method thereof in the following.

According to a first aspect of the present invention, a ceramic separation membrane structure including a ceramic porous body, a zeolite separation membrane disposed on the ceramic porous body, and zeolite repaired portions containing zeolite of structure different from a structure of zeolite of the zeolite separation membrane deposited in defect portions which are not covered with the zeolite separation membrane and where the surface of the ceramic porous body is exposed, wherein the zeolite separation membrane and the zeolite repaired portion are made of a hydrophobic zeolite having a ratio of $SiO_2/Al_2O_3=100$ or more, is provided.

According to a second aspect of the present invention, the ceramic separation membrane structure according to the above first aspect is provided, wherein in the zeolite of the zeolite repaired portion, the number of oxygen atoms included in each ring structure is smaller than, equal to, or 1 to 4 larger than the number of oxygen atoms of the zeolite of the zeolite separation membrane.

According to a third aspect of the present invention, the ceramic separation membrane structure according to the above first or second aspects is provided, wherein a percentage of the zeolite repaired portion to the zeolite separation membrane is 20% or less in terms of mass ratio.

According to a fourth aspect of the present invention, the ceramic separation membrane structure according to any one of the above first to third aspects is provided, wherein the ceramic porous body has a monolith shape.

According to a fifth aspect of the present invention, the ceramic separation membrane structure according to any one of the above first to fourth aspects is provided, wherein the zeolite of the zeolite separation membrane is of a DDR type, and the zeolite of the zeolite repaired portion is of an MFI type.

According to a sixth aspect of the present invention, a repair method of a ceramic separation membrane structure in which a zeolite separation membrane is disposed on a ceramic porous body, and then zeolite repaired portions containing zeolite of structure different from a structure of zeolite of the zeolite separation membrane is formed.

According to a seventh aspect of the present invention, the repair method of the ceramic separation membrane structure according to the above sixth aspect is provided, wherein the zeolite separation membrane and the zeolite repaired portion are made of a hydrophobic zeolite wherein $SiO_2/Al_2O_3=100$ or more.

According to an eighth aspect of the present invention, the repair method of the ceramic separation membrane structure according to the above sixth or seventh aspects is provided, wherein a repairing sol to form the zeolite of the structure different from the structure of zeolite of the zeolite separation membrane is prepared, the ceramic porous body on which the zeolite separation membrane is disposed is immersed into the repairing sol, and a heating treatment is performed to form the zeolite repaired portions.

According to a ninth aspect of the present invention, the repair method of the ceramic separation membrane structure according to any one of the above sixth to eighth aspects is provided, wherein the zeolite separation membrane before repair includes a structure directing agent, and the zeolite repaired portions are formed before or after the structure directing agent is removed.

According to a tenth aspect of the present invention, the repair method of the ceramic separation membrane structure according to the above ninth aspect is provided, wherein the structure directing agent of the zeolite repaired portion is different from the zeolite separation membrane.

Effect of the Invention

A separation membrane structure includes a zeolite separation membrane, and a zeolite repaired portion containing a zeolite of a structure different from a structure of zeolite of the zeolite separation membrane deposited in defect portions which are not covered with the zeolite separation membrane and where the surface of a ceramic porous body is exposed. That is, the defect portions of the zeolite separation membrane are repaired by the zeolite repaired portions, and the separation membrane structure is excellent in separation performance.

The zeolite separation membrane and the zeolite repaired portions are made of a hydrophobic zeolite, and hence the zeolite repaired portions are selectively deposited in the exposed portions (defect portions) of the porous body (substrate) which are not covered with the zeolite separation membrane. Therefore, a membrane thickness does not increase, and hence a permeation amount does not decrease.

DETAILED DESCRIPTION OF THE INVENTION

Hereinafter, embodiments of the present invention will be described with reference to the drawings. The present invention is not limited to the following embodiments, and changes, modifications and improvements can be added without departing from the gist of the present invention.

(1) Ceramic Separation Membrane Structure

Figure 1:
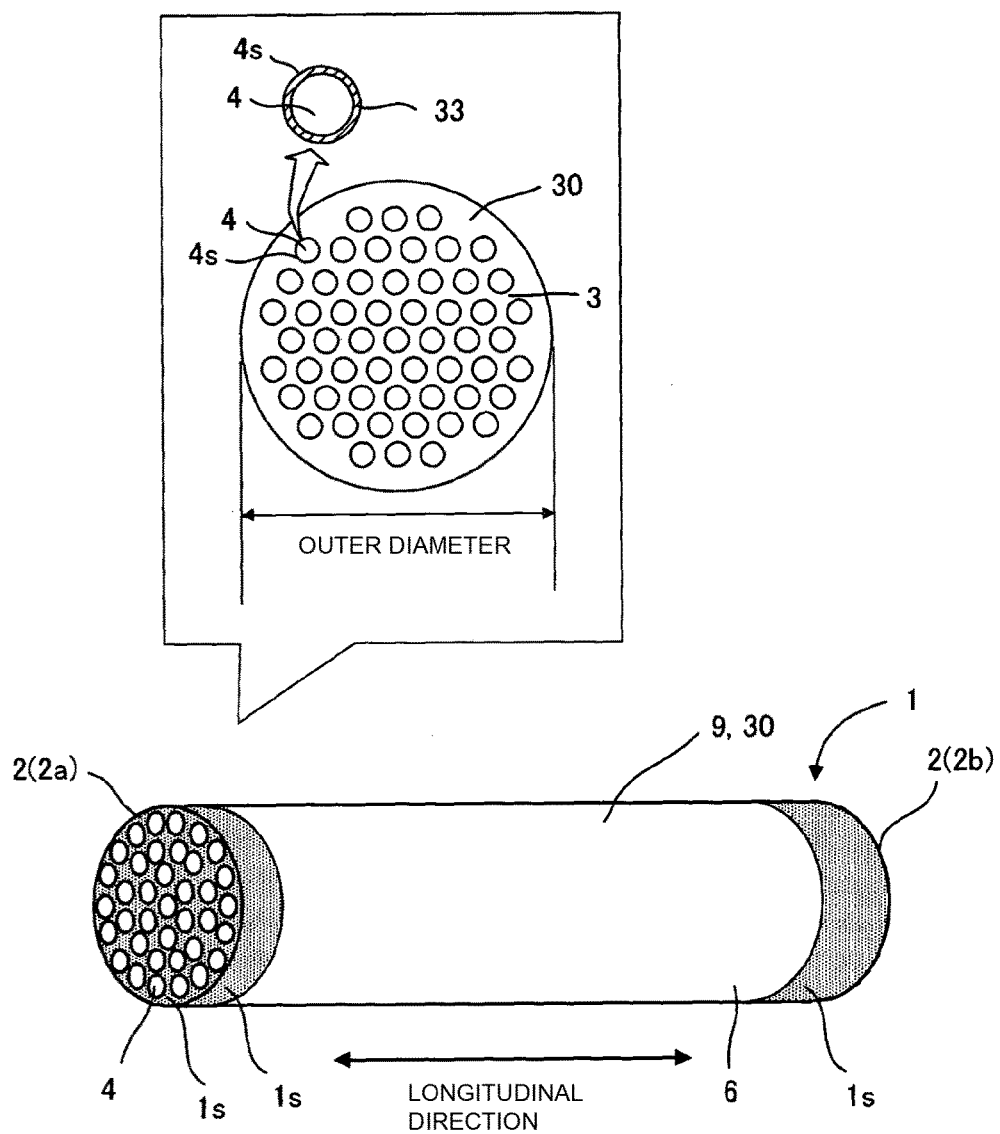
FIG. 1 is a view showing one embodiment of a monolith type separation membrane structure according to the present invention.
Figure 2A:
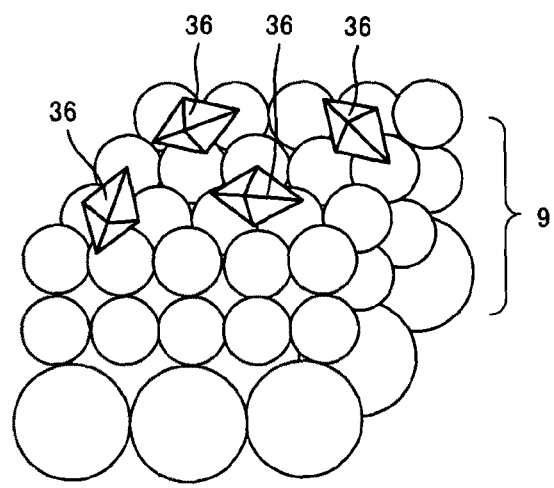
FIG. 2A is a schematic view showing a step of allowing seed crystals to adhere onto a ceramic porous body.
Figure 2B:
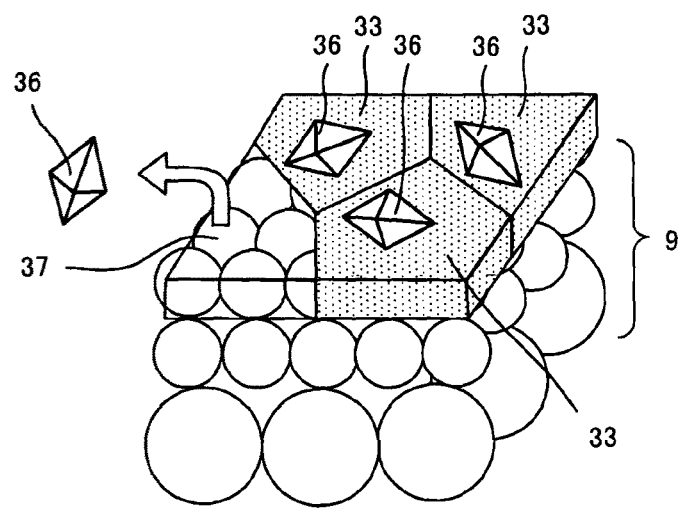
FIG. 2B is a schematic view showing a step of forming a zeolite separation membrane.
Figure 2C:
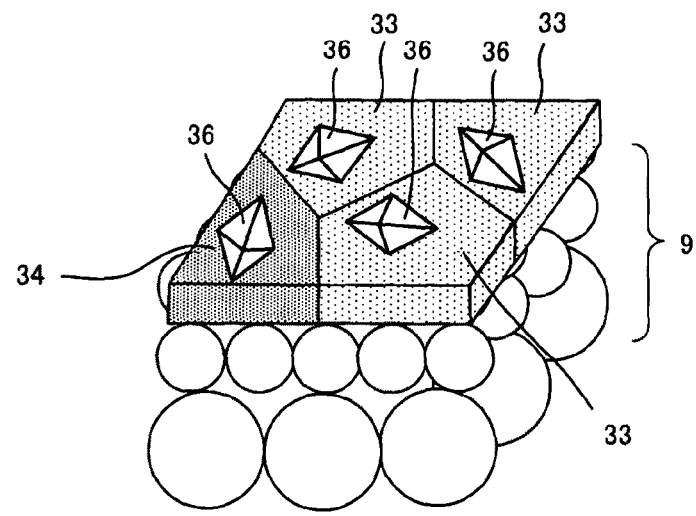
FIG. 2C is a schematic view showing a step of forming a zeolite repaired portion.

FIG. 1 shows one embodiment of a ceramic separation membrane structure 1 according to the present invention. FIG. 2A to FIG. 2C show steps of forming a zeolite separation membrane 33 and a zeolite repaired portion 34 on a ceramic porous body 9. FIG. 2A shows a step in which seed crystals 36 are allowed to adhere onto the ceramic porous body 9. FIG. 2B shows a step in which the zeolite separation membrane 33 is formed. FIG. 2C shows a step in which the zeolite repaired portion 34 is formed.

The ceramic separation membrane structure 1 of the present invention (simply referred to also as separation membrane structure) includes the ceramic porous body 9 (simply referred to also as porous body), the zeolite separation membrane 33 (simply referred to also as the separation membrane) disposed on the ceramic porous body 9, and the zeolite repaired portion 34 containing a zeolite of a structure different from the structure of zeolite of the zeolite separation membrane 33 deposited in defect portions 37 which are not covered with the zeolite separation membrane 33 and where the surface of the ceramic porous body 9 is exposed. It is to be noted that the zeolite repaired portion 34 is formed by preferably 90 mass % or more and most preferably 100 mass % of the zeolite of different structure. As such, the defect portion is repaired with the zeolite of structure different from the structure of zeolite of the zeolite separation membrane 33, so that the defect portion 37 can be repaired without deposition of zeolite on the zeolite separation membrane 33 or increasing of membrane thickness.

As shown in FIG. 1, the porous body 9 has partition walls 3 made of a porous material in which a large number of pores are formed, and by the partition walls 3, cells 4 which become through channels for a fluid are formed. The separation membrane 33 and the zeolite repaired portion 34 are formed on inner wall faces 4s of the cells 4.

In the present description, the ceramic porous body 9 means a substrate 30, but when a plurality of layers having varied average particle diameters are disposed on the substrate 30, the layers are also included in the porous body 9.

As shown in FIG. 2A, when the separation membrane 33 is formed, the seed crystals 36 are allowed to adhere. As shown in FIG. 2B, the separation membrane 33 is formed by hydrothermal synthesis, whereby the seed crystals 36 are detached, and causes defects. Then, the zeolite repaired portion 34 is farmed after the separation membrane 33 is formed. That is, as shown in FIG. 2C, the zeolite separation membrane 33 is disposed on the ceramic porous body 9, and the defect of the zeolite separation membrane 33 is repaired by the zeolite repaired portion 34. Furthermore, the zeolite separation membrane 33 and the zeolite repaired portion 34 are made of a hydrophobic zeolite wherein $SiO_2/Al_2O_3=100$ or more. The separation membrane 33 and the zeolite repaired portion 34 are made of the hydrophobic zeolite, so that a repulsive force acts also during the hydrothermal synthesis, and the zeolite is selectively deposited at exposed portion of the surface of the porous body 9. Therefore, the zeolite repaired portion 34 is not deposited on the zeolite separation membrane 33 and the membrane thickness does not increase; hence the permeation amount does not decrease.

The zeolite separation membrane before the repair includes structure directing agent, and the zeolite repaired portion can be formed before or after the structure directing agent is removed. In addition, the structure directing agent to form the zeolite separation membrane 33 is preferably different from the structure directing agent to form the zeolite repaired portion 34. That is, when the structure directing agent different from that of the zeolite separation membrane 33 is used in forming the zeolite repaired portion 34, the defect portion 37 can be repaired without growing the zeolite separation membrane 33.

A percentage of the zeolite repaired portions 34 to the zeolite separation membrane 33 is preferably 20% or less in terms of mass ratio. The mass ratio mentioned here is a mass ratio quantitatively analyzed by X-ray diffraction. A mixture of powder of zeolite which becomes the zeolite separation membrane 33 and powder of the zeolite which becomes the zeolite repaired portions 34 at a predetermined mass ratio (e.g., separation membrane:repaired portion=9:1) is prepared beforehand to obtain a reference substance. Then, the X-ray diffraction of the reference substance is performed to prepare a calibration curve. Afterward, the X-ray diffraction of the repaired zeolite separation membrane 33 is performed, and the value of the calibration curve of the membrane is compared with the value of the calibration curve of the reference substance, thereby quantitatively determining the mass of the zeolite repaired portions 34. The percentage of the zeolite repaired portions 34 which is obtained as described above is 20% or less, so that the performance of the zeolite separation membrane 33 can sufficiently be exerted. Hereinafter, the substrate 30, the separation membrane 33, the zeolite repaired portion 34 and the like will be described in detail.

(Substrate)

The material of the substrate 30 is preferably a porous ceramic material. More preferably, aggregate particles are made of alumina ($Al_2O_3$), titania ($TiO_2$), mullite ($Al_2O_3.SiO_2$), potsherd, cordierite ($Mg_2Al_4Si_5O_{18}$) and the like. Among these, alumina is further preferable, because a raw material (aggregate particles) having controlled particle diameters is easily available, a kneaded material can stably be formed, and the alumina has a high corrosion resistance.

The substrate 30 has a round pillar outer shape and has a circumferential face 6, however there is not any special restriction on the whole shape or size of the substrate 30 as long as the separating function of the substrate is not disturbed. Examples of the whole shape include a round pillar shape, a quadrangular pillar shape (tubular shape in which a cross section perpendicular to the central axis is quadrangular), and a triangular pillar shape (tubular shape in which a cross section perpendicular to the central axis is triangular). Among these, the round pillar shape is preferable, because extrusion is easily performed, less firing deformation occurs, and sealing with a housing is easily performed. For use in microfiltration or ultrafiltration, it is preferable that the round pillar shape has a diameter of 30 to 220 mm in the cross section perpendicular to the central axis and has a length of 150 to 2000 mm in the central axis direction. That is, one embodiment of the substrate 30 may be a monolith type (monolith shape). "The monolith type" is a shape in which a plurality of cells are formed from one end face to the other end face in a longitudinal direction or a honeycomb shape. Alternatively, the substrate 30 may have a hollow cylindrical shape.

The substrate 30 of the embodiment shown in FIG. 1 has the plurality of cells 4 which are defined and formed by the porous partition walls 3 from one end face 2a to the other end face 2b in the longitudinal direction and become through channels for a fluid. The substrate 30 has 30 to 2500 cells 4 extending through the structure on both end sides in the longitudinal direction and extending in parallel with the longitudinal direction.

Examples of a sectional shape of the cells 4 of the substrate 30 (shape in the cross section perpendicular to the extending direction of the cells 4) include a round shape, an elliptic shape, and a polygonal shape, and examples of the polygonal shape include a quadrangular shape, a pentangular shape, a hexagonal shape, and a triangular shape. It is to be noted that the extending direction of the cells 4 is the same as the central axis direction, when the substrate 30 has the round pillar shape.

When the sectional shape of each of the cells 4 of the substrate 30 is round, the diameter of the cells 4 is preferably from 1 to 5 mm. When the diameter is 1 mm or more, the membrane area can sufficiently be acquired. When the diameter is 5 mm or less, a sufficient strength can be obtained.

A plurality of layers having varied average particle diameters can be disposed on the substrate 30. Specifically, an intermediate layer and a surface layer each having a small average particle diameter can be laminated on the substrate 30. When the intermediate layer and the surface layer are disposed, these layers are also included in the porous body 9.

In both of the end faces 2a and 2b of the substrate 30, sealing portions 1s are preferably disposed. When the sealing portions 1s are disposed in this manner, it can prevent the mixture from partially flowing into the substrate 30 directly from the end faces 2 of the substrate 30 without passing through the separation membrane 33, and mixing with the gas or the like which has passed through the separation membrane 33 and discharged from the outer circumferential face 6. Examples of the sealing portion 1s include a glass seal and a metal seal.

(Separation Membrane)

In the separation membrane 33, a plurality of pores are formed at an average pore diameter smaller than that of the porous body 9 (substrate 30, or when the intermediate layer and the surface layer are disposed, these layers also included). The separation membrane is disposed on wall faces (inner wall faces 4s) of the cells 4. Alternatively, the separation membrane 33 may be disposed on a circumferential face of a hollow cylindrical substrate 30.

The average pore diameter of the separation membrane 33 can suitably be determined in accordance with the required filtration performance or separation performance (particle diameters of the substance to be removed). For example, in the case of a ceramic filter for use in microfiltration or ultrafiltration, the average pore diameter is preferably from 0.01 to 1.0 μm. In such case, the average pore diameter of the separation membrane 33 is a value measured by an air flow method described in ASTM F316.

As the zeolite separation membrane 33, a zeolite of a crystal structure such as LTA, MFI, MOR, FER, FAU, DDR, CHA or BEA or the like can be used. When the separation membrane 33 is made of the DDR type zeolite, the membrane can be used as a gas separation membrane for selectively separating carbon dioxide.

(Zeolite Repaired Portions)

The zeolite repaired portion 34 is formed while containing a zeolite of structure different from the structure of zeolite of the zeolite separation membrane 33 deposited in the defect portions 37 which are not covered with the zeolite separation membrane 33 and where the surface of the ceramic porous body 9 is exposed.

In the zeolite of the zeolite repaired portion 34, the number of oxygen atoms included in each ring structure is preferably smaller than, equal to, or 1 to 4 larger than the number of oxygen atoms included in each ring structure of zeolite of the zeolite separation membrane 33. That is, the number is preferably "larger as much as 4" or less. For example, when the zeolite of the zeolite separation membrane 33 is a DDR type, corresponding are an SOD type in which the number of the oxygen atoms is small, an MFI type in which the number of the oxygen atoms is larger as much as 2, and a BEA type in which the number of the oxygen atoms is larger as much as 4. The zeolite having a larger number of oxygen atoms usually has the tendency that pore diameters are larger. When the number of the oxygen atoms of the zeolite repaired portion 34 is excessively larger than that of the zeolite separation membrane 33, there is the possibility that the effect of repair is deteriorated.

As the zeolite repaired portion 34, a zeolite having a crystal structure such as LTA, MFI, MOR, FER, FAU, DDR, CHA or BEA or the like can be used.

The zeolite repaired portion 34 is more preferably used in a state where the structure directing agent is not included, for the purpose of improving durability against temperatures, chemicals or the like, and in such case, zeolites as described above is preferably selected. On the other hand, when the zeolite repaired portion 34 is used in the state where the structure directing agent is included, the hydrophobic zeolite having the ratio of $SiO_2/Al_2O_3=100$ or more can be used irrespective of the number of the oxygen atoms.

As to the zeolite of structure different from the structure of zeolite of the zeolite separation membrane 33, examples of the zeolite of the zeolite repaired portion 34 include the MFI type and the BEA type, when the zeolite of the zeolite separation membrane 33 is the DDR type. As described above, when the repair is performed by using the zeolite of structure different from the structure of zeolite of the zeolite separation membrane 33, the zeolite is not deposited on the zeolite separation membrane 33, and the membrane thickness does not increase.

(2) Manufacturing Method (2-1) Substrate

Next, a manufacturing method of the separation membrane structure 1 in which the monolith type substrate 30 is used will be described. First, a raw material of the porous body 9 is formed. For example, extrusion is performed by using a vacuum extrusion machine. In consequence, the monolith type unfired substrate 30 having the cells 4 is obtained. Additionally, press molding, casting or the like can also suitably be selected. Then, the unfired substrate 30 is fired at, for example, 900 to 1450° C.

(2-2) Zeolite Separation Membrane

Figure 4:
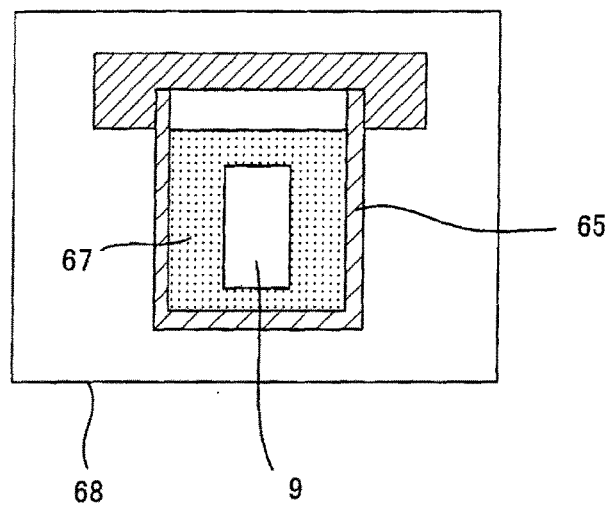
FIG. 4 is a schematic view showing one embodiment of a membrane forming step of forming the zeolite separation membrane on the porous body by hydrothermal synthesis.

Next, the zeolite separation membrane 33 is formed on the inner wall faces 4s of the cells 4. The zeolite separation membrane 33 for use in the present invention can be synthesized by a heretofore well-known method. For example, as shown in FIG. 4, a raw material solution (sol 67) of a silica source, an alumina source, a structure directing agent, an alkali source, water and the like is prepared, and the porous body 9 and the prepared raw material solution (sol 67) are placed in a pressure-resistant container 65. Afterward, they are placed in a drier 68, and a heating treatment (hydrothermal synthesis) is performed at 100 to 200° C. for 1 to 240 hours, thereby producing the zeolite separation membrane 33.

Figure 3:
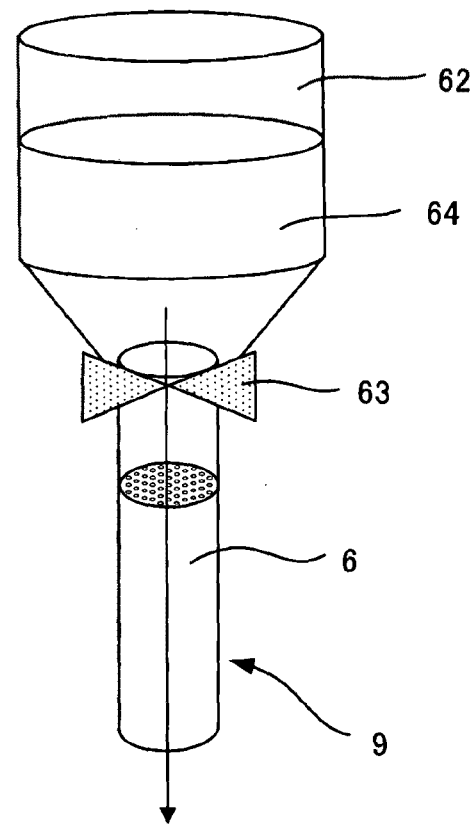
FIG. 3 is a schematic view showing a state in which a seeding slurry is poured in a particle adhering step.

At this time, zeolite is preferably applied as seed crystals 36 to the porous body 9 (substrate 30) beforehand (see FIG. 2A). FIG. 3 shows one embodiment of seeding by a flow-down method. The porous body 9 is fixedly attached to a lower end of a wide-mouthed funnel 62, and the cock 63 is opened to pour the seeding slurry 64 inside from above the porous body 9, so that the slurry can pass inside the cells 4 and allow the seed crystals 36 to adhere thereonto.

Next, the porous body 9 on which the zeolite separation membrane 33 is formed is washed with water or warm water of 80 to 100° C., taken out and dried at 80 to 100° C. Furthermore, the porous body 9 is placed in an electric furnace, and heated at 400 to 800° C. in the air atmosphere for 1 to 200 hours, to burn and remove the structure directing agent in the pores of the zeolite separation membrane 33. As described above, the zeolite separation membrane 33 can be formed.

Examples of the silica source include colloidal silica, tetraethoxysilane, water glass, silicon alkoxide, fumed silica, and precipitated silica.

The structure directing agent is used to form the pore structures of the zeolite. There is not any special restriction, however examples of the agent include organic compounds such as tetraethylammonium hydroxide, tetraethylammonium bromide, 1-adamantaneamine, tetrapropylammonium hydroxide, tetrapropylammonium bromide, and tetramethylammonium hydroxide.

Examples of the alkali source include alkali metals such as sodium hydroxide, lithium hydroxide and potassium hydroxide, alkaline earth metals such as magnesium hydroxide and calcium hydroxide, and quaternary ammonium hydroxide.

The manufacturing method of the zeolite separation membrane 33 is applicable to the zeolite of crystal structure such as LTA, MFI, MOR, FER, FAU, DDR, CHA or BEA.

(2-3) Zeolite Repaired Portion

Next, a method of producing the zeolite repaired portions 34 to repair the defects will be described. As shown in FIG. 2B, when the separation membrane 33 is formed by the hydrothermal synthesis, the seed crystals 36 are detached, and causes defects.

In the repair method of the ceramic separation membrane structure of the present invention, as shown in FIG. 2C, there is formed the zeolite repaired portion 34 containing the zeolite of structure different from the structure of zeolite of the zeolite separation membrane 33 disposed on the ceramic porous body 9. The zeolite separation membrane 33 and the zeolite repaired portion 34 are made of the hydrophobic zeolite wherein $SiO_2/Al_2O_3=100$ or more.

As the repair method, first, the repairing sol is prepared from a silica source, an alumina source, a structure directing agent, an alkali source, water and the like. The obtained repairing sol is placed in the pressure-resistant container 65, and the separation membrane structure 1 is immersed into the repairing sol without applying the seed crystals 36 to the separation membrane structure 1 to be repaired (in which the zeolite separation membrane 33 is formed). Furthermore, they are placed in a drier 68, and heating treatment (hydrothermal synthesis) is performed at 100 to 200° C. for 1 to 240 hours, thereby forming the zeolite repaired portions 34 repairing the zeolite separation membrane 33.

Next, the separation membrane structure 1 in which the zeolite repaired portion 34 is formed is washed with water or warm water of 80 to 100° C., taken out and dried at 80 to 100° C. Furthermore, the separation membrane structure 1 is placed in an electric furnace, and heated at 400 to 800° C. in the air atmosphere for 1 to 200 hours, to burn and remove the structure directing agent in the pores of the zeolite separation membrane. As described above, the zeolite separation membrane 33 can be repaired. When the structure directing agent remains to be included, the heating in the air atmosphere is not required.

(3) Separation Method

Figure 5A:
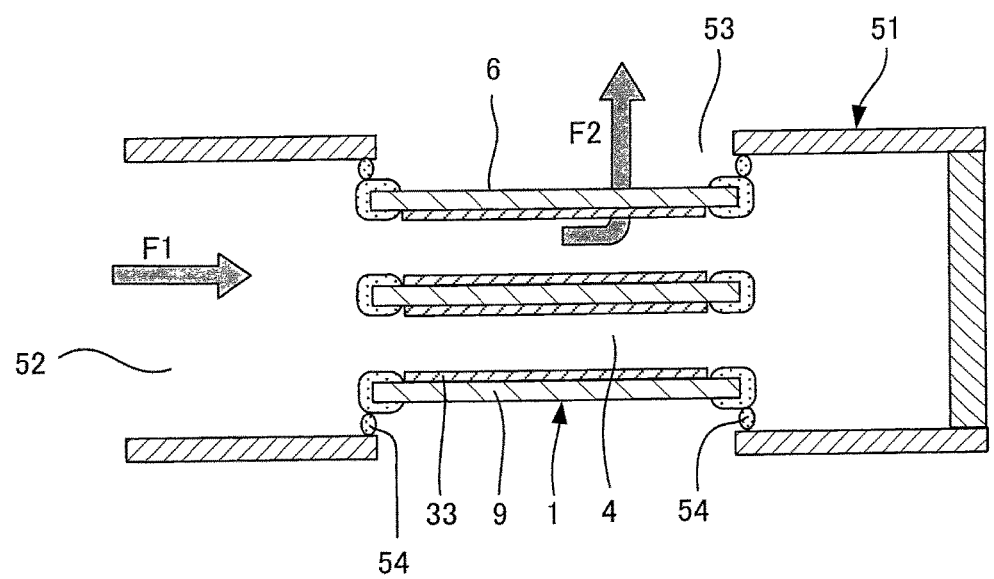
FIG. 5A is a schematic view showing an embodiment in which the monolith type separation membrane structure is attached to a housing and showing a cross section of a ceramic separation membrane structure which is parallel to the cell extending direction.

Next, there will be described a method of separating part of components from a fluid having a plurality of types of fluids mixed, by use of the separation membrane structure 1 of the present embodiment. As shown in FIG. 5A, when the fluid is separated by using the separation membrane structure 1 of the present embodiment, it is preferable that the separation membrane structure 1 is housed in a tubular housing 51 having a fluid inlet 52 and a fluid outlet 53, a fluid to be treated F1 which is allowed to flow inside from the fluid inlet 52 of the housing 51 is separated by the separation membrane structure 1, and the separated fluid to be treated (treated fluid F2) is discharged from the fluid outlet 53.

When the separation membrane structure 1 is housed in the housing 51, as shown in FIG. 5A, the space between the separation membrane structure 1 and the housing 51 is preferably closed with sealing members 54, 54 at both end portions of the separation membrane structure 1. There is not any special restriction on the sealing member 54, however an example of the sealing member is an O-ring.

All the fluid to be treated F1 that is allowed to flow into the housing 51 from the fluid inlet 52 flows into the cells 4 of the separation membrane structure 1, and the fluid to be treated F1 which is allowed to flow into the cells 4 permeates the separation membrane 33 to become the treated fluid F2, thereby penetrates into the substrate 30. Furthermore, the fluid flows out from the substrate 30 through the circumferential face 6 of the substrate 30 and is discharged to the outside (external space) from the fluid outlet 53. The sealing members 54, 54 can prevent the fluid to be treated F1 from being mixed with the treated fluid F2.

Figure 5B:
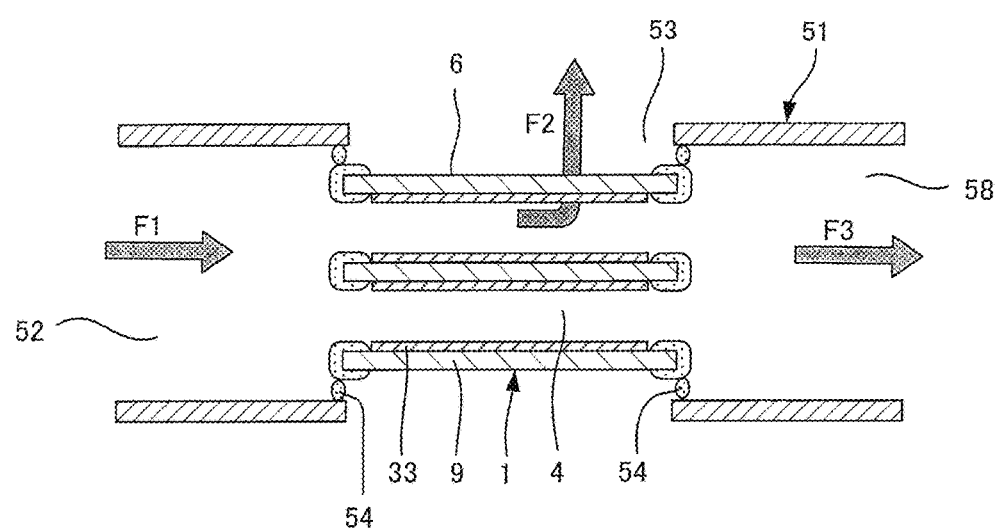
FIG. 5B is a schematic view showing another embodiment in which a monolith type separation membrane structure is attached to a housing and showing a cross section of a ceramic separation membrane structure which is parallel to the cell extending direction.

FIG. 5B shows another embodiment in which a separation membrane structure 1 is attached to a housing 51. As shown in FIG. 5B, the separation membrane structure 1 is housed in the tubular housing 51 having a fluid inlet 52 and fluid outlets 53 and 58. In this embodiment, the fluid to be treated F1 which is allowed to flow inside from the fluid inlet 52 of the housing 51 is separated by the separation membrane structure 1, the separated fluid to be treated (treated fluid F2) can be discharged from the fluid outlet 53, and the residual fluid (fluid F3) can be discharged from the fluid outlet 58. The fluid F3 can be discharged from the fluid outlet 58, so that a flow speed of the fluid to be treated F1 can be increased during operation, and the permeation flow speed of the treated fluid F2 can be increased.

EXAMPLES

Hereinafter, the present invention will be described in more detail on the basis of examples, but the present invention is not limited to these examples.

Example 1

(1) Preparation of Substrate (Porous Body)

A monolith type substrate 30 was prepared and a separation membrane 33 was formed in cells 4 of the substrate. First, the preparation of the substrate 30 will be described.

(Substrate)

20 parts by mass of a sintering auxiliary agent (an inorganic binder) was added to 100 parts by mass of alumina particles (aggregate particles) having an average particle diameter of 50 μm and further, water, a dispersing agent and a thickening agent were added, mixed and kneaded to prepare a kneaded material. The obtained kneaded material was extruded and the unfired substrate 30 having a honeycomb shape was prepared.

Next, the substrate 30 was fired. As firing conditions, the firing was performed at 1250° C. for 1 hour and each of temperature raising and lowering speeds was set to 100° C./hour.

The porous body 9 had an round pillar outer shape, an outer diameter of the porous body of 30 mm, a cell diameter of 2.5 mm, the number of the cells of 55, and a length of 160 mm.

(2) Formation of DDR Membrane.

As the separation membrane 33, a DDR type zeolite membrane (simply referred to also as the DDR membrane) was formed on inner wall faces 4s of the cells 4 of the porous body 9.

(2-1) Preparation of Seed Crystals Based on a method of manufacturing a DDR type zeolite described in M. J. den Exter, J. C. Jansen, H. van Bekkum, Studies in Surface Science and Catalysis vol. 84, Ed. by J. Weitkamp et al., Elsevier (1994) 1159 to 1166, or the publication of JP-A-2004-083375, DDR type zeolite crystal powder was manufactured, and used as it was or pulverized if necessary, as seed crystals 36. The synthesized or pulverized seed crystals 36 were dispersed in water, and then coarse particles were removed, to prepare a seed crystal dispersion liquid.

(2-2) Seeding (Particle Adhering Step)

The seed crystal dispersion liquid prepared in (2-1) was diluted with ion exchanged water or ethanol, was adjusted so that a DDR concentration was from 0.001 to 0.36 mass % (solid content in the slurry 64), and was stirred with a stirrer at 300 rpm, to obtain a seeding slurry liquid (slurry 64). The porous body 9 which was porous was fixedly attached to a lower end of a wide-mouthed funnel 62, and 160 ml of seeding slurry liquid was poured inside from above the porous body 9, and was allowed to pass inside the cells (see FIG. 3). The porous body 9 in which the slurry 64 flowed down was dried by sending wind in the cells for 10 to 30 minutes under the conditions of room temperature or 80° C. and a wind velocity of 3 to 6 m/s. The flow-down of the slurry 64 and the drying by sending wind were repeated 1 to 6 times to obtain a sample. The sample was dried, and then microstructure observation by an electron microscope was performed. It was confirmed that DDR particles adhered to the surface of the porous body 9.

(2-3) Membrane Formation (Membrane Forming Step)

7.35 g of ethylenediamine (manufactured by Wako Pure Chemical Industries, Ltd.) was placed in a 100 ml wide-mouthed bottle made of fluororesin, and then 1.156 g of 1-adamantaneamine (manufactured by Aldrich Co.) was added and dissolved so that a precipitate of 1-adamantaneamine does not remain. 98.0 g of 30 mass % colloidal silica (trade name: Snowtex S manufactured by Nissan Chemical Industries, Ltd.) and 116.55 g of ion exchanged water were placed in another container and lightly stirred. Afterward, this was added to the wide-mouthed bottle in which ethylenediamine and 1-adamantaneamine were mixed, and strongly shaken to prepare a raw material solution. Molar ratios of the respective components of the raw material solution were 1-adamantaneamine/$SiO_2$=0.016 and water/$SiO_2$=21. Afterward, the wide-mouthed bottle containing the raw material solution was set to a homogenizer and the solution was stirred for 1 hour. The porous body 9 to which the DDR particles were allowed to adhere in (2-2) was disposed in a stainless steel pressure-resistant container 65 with an inner tube having an inner capacity of 300 ml and made of fluororesin, the prepared raw material solution (sol 67) was put in, and a heating treatment (hydrothermal synthesis) was performed at 140° C. for 50 hours (see FIG. 4). It is to be noted that, during the hydrothermal synthesis, the solution was alkaline due to the raw materials of colloidal silica and ethylenediamine. When a broken surface of the porous body 9 on which the membrane was formed was observed by a scanning type electron microscope, a membrane thickness of the DDR membrane was 10 µm or less.

The ratio of $SiO_2/Al_2O_3$ was obtained by oxide conversion of an element ratio measured by EDS (energy dispersive X-ray spectroscopy). In the DDR membrane, $SiO_2/Al_2O_3=\infty$ (infinity). The adhered amount of the DDR membrane was 20 g/m².

(3) Repair of Zeolite Separation Membrane

In Example 1, the DDR membrane (before removal of structure directing agent) was repaired with MFI (before removal of structure directing agent). Hereinafter, description will specifically be made.

(MFI Sol Preparation)

0.84 g of 40 mass % tetrapropylammonium hydroxide solution (manufactured by LION AKZO Co., Ltd.) and 0.44 g of tetrapropylammonium bromide (manufactured by SACHEM Co., Ltd.) were mixed, and further, 202.1 g of distilled water and 6.58 g of about 30 mass % silica sol (trade name: Snowtex S manufactured by Nissan Chemical Industries, Ltd.) were added and stirred with a magnetic stirrer at room temperature for 30 minutes, to prepare a sol.

(MFI (the number of oxygen atoms: 10) Repair)

The obtained sol was placed in a 300 ml pressure-resistant container which was made of stainless steel and in which an inner tube made of fluororesin was disposed, and the separation membrane structure 1 in which the DDR membrane was disposed (before removal of structure directing agent) was immersed and reacted at 160° C. in a hot air drier for 12 hours. The support after reaction was dried at 80° C. for 16 hours after 5 times of boiling washing (washing operations). The adhered amount of MFI for repair was 3.1 g/m². Additionally, from the result of the EDS, the value of MFI membrane was $SiO_2/Al_2O_3$=1500. The percentage of zeolite repaired portion 34 to the zeolite separation membrane 33 was 14% in terms of mass ratio.

(4) Repair Evaluation of Zeolite Separation Membrane Before Removal of Structure Directing Agent ($N_2$ Permeation Amount Measurement)

$N_2$ gas was introduced into the cells 4 of the separation membrane structure 1 before the repair, and applied at 0.2 MPa, the permeation flow rate (L/min) of the $N_2$ gas which has permeated through the separation membrane 33 was measured with a mass flow meter, and the permeation amount (L/min·m²·kPa) was calculated. After the repair, the amount was also measured in a similar method, and it was judged that the membrane was repaired, when the $N_2$ permeation amount lowered.

TABLE 1

| | Separation membrane | Removal of structure directing agent | Repaired portion | Before repair $N_2$ leakage amount (permeation amount: L/min · m² · kPa) | After repair $N_2$ leakage amount (permeation amount: L/min · m² · kPa) |
|---|---|---|---|---|---|
| Example 1 | DDR membrane | Before | MFI | 0.002613 | 0.000015 |

Figure 6:
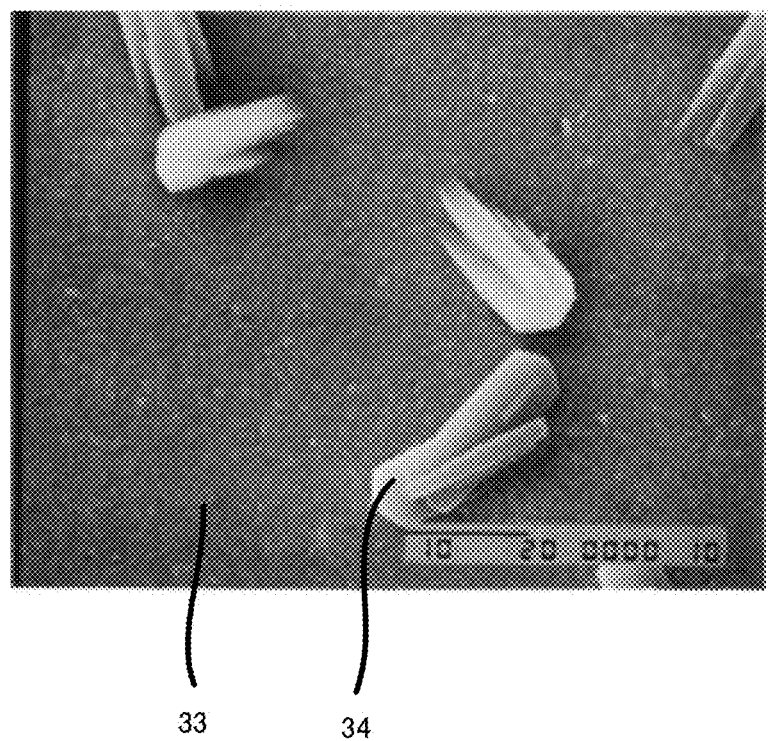
FIG. 6 is an SEM photograph showing a repaired zeolite separation membrane.

It was confirmed that the $N_2$ permeation amount after the repair was lower than that before the repair and hence it was judged that the defect portions 37 were repaired. As a result of SEM observation, MFI type zeolite was not deposited on the DDR membrane, but was deposited only in the defect portions 37 (FIG. 6). In addition, according to the result of EDS, the MFI type zeolite in the repaired portions 34 had a ratio of $SiO_2/Al_2O_3=\infty$.

Example 2

The procedure of Example 1 was repeated to perform (1) preparation of substrate (porous body) and (2) formation of DDR membrane ((2-1) to (2-3)).

(2-4) Structure Directing Agent Removal

The membrane formed in the membrane forming step was heated with an electric furnace at 450 or 500° C. in the air atmosphere for 50 hours, and 1-adamantaneamine in the pores was burnt and removed. By X-ray diffraction, the crystal phase was identified, and was confirmed that it was a DDR type zeolite. In addition, after the membrane formation, it was confirmed that the porous body 9 was coated with the DDR type zeolite.

(3) Repair of Zeolite Separation Membrane

In Example 2, the DDR membrane after removal of a structure directing agent was repaired with MFI. Hereinafter, description will specifically be made.

(MFI Sol Preparation)

0.84 g of 40 mass % tetrapropylammonium hydroxide solution (manufactured by LION AKZO Co., Ltd.) and 0.44 g of tetrapropylammonium bromide (manufactured by SACHEM Co., Ltd.) were mixed, and further, 202.1 g of distilled water and 6.58 g of about 30 mass % silica sol (trade name: Snowtex S manufactured by Nissan Chemical Industries, Ltd.) were added and stirred with a magnetic stirrer at room temperature for 30 minutes, to prepare a sol.

(MFI (the number of oxygen atoms: 10) Repair)

The obtained sol was placed in a 300 ml pressure-resistant container which was made of stainless steel and in which an inner tube made of fluororesin was disposed, and the separation membrane structure 1 in which the DDR membrane was disposed (after removal of structure directing agent) was immersed and reacted at 160° C. in a hot air drier for 6 to 30 hours. The support after reaction was dried at 80° C. for 16 hours after 5 times of boiling washing (washing operations). The adhered amount of MFI for repair was 3.5 g/m². The temperature was raised up to 450° C. in an electric furnace and held for 4 hours to remove tetrapropylammonium.

Example 3

The procedure of Example 1 was repeated to perform (1) preparation of substrate (porous body) and (2) formation of DDR membrane ((2-1) to (2-3)).

(2-4) Structure Directing Agent Removal

The membrane formed in the membrane forming step was heated with an electric furnace at 450 or 500° C. in the air atmosphere for 50 hours, and 1-adamantaneamine in the pores was burnt and removed. By X-ray diffraction, the crystal phase was identified and was confirmed that it was a DDR type zeolite. In addition, after the membrane formation, it was confirmed that the porous body 9 was coated with the DDR type zeolite.

(3) Repair of Zeolite Separation Membrane

In Example 3, the DDR membrane after removal of structure directing agent was repaired with BEA. Hereinafter, description will specifically be made.

(BEA Sol Preparation)

85.1 g of 35 mass % tetraethylammonium solution, 33.7 g of distilled water, 81.0 g of about 30 mass % silica sol (trade name: Snowtex S manufactured by Nissan Chemical Industries, Ltd.) and 0.5 g of aluminum nitrate aqueous solution were added and stirred with a magnetic stirrer at room temperature for 60 minutes, to prepare a sol.

(BEA (the Number of Oxygen Atoms: 12) Repair)

The obtained sol was placed in a 300 ml pressure-resistant container which was made of stainless steel and in which an inner tube made of fluororesin was disposed, and the separation membrane structure 1 in which the DDR membrane was disposed (after removal of structure directing agent) was immersed and reacted at 120° C. to 150° C. in a hot air drier for 80 to 200 hours. The support after reaction was dried at 80° C. for 16 hours after 5 times of boiling washing (washing operations). The adhered amount of BEA for repair was 1.2 g/m². The temperature was raised up to 450° C. in the electric furnace and held for 4 hours to remove tetraethylammonium.

(4) Repair Evaluation of Zeolite Separation Membrane after Removal of Structure Directing Agent (Examples 2 and 3) ($CO_2$ Permeation Amount Measurement, Separation Performance)

For the case where the separation membrane 33 was DDR membrane, the separation coefficient was obtained as follows. A mixed gas of carbon dioxide ($CO_2$) and methane ($CH_4$) (volume ratio of respective gases was 50:50 and partial pressure of each gas was 0.2 MPa) was introduced into cells 4 of the separation membrane structure 1, the permeation flow rate of the $CO_2$ gas permeated through the separation membrane 33 was measured with a mass flow meter, and a $CO_2$ permeation amount was calculated (Table 2). The $CO_2$ permeation amount indicates a $CO_2$ gas treatment performance of the separation membrane 33. The larger the $CO_2$ permeation amount is, the treatment amount increases more, which results in the separation membrane 33 of high performance.

In addition, the gas permeated through the separation membrane 33 was collected to perform component analysis by use of a gas chromatograph, and the separation coefficient was calculated by an equation of "separation coefficient $\alpha$=(permeated $CO_2$ concentration/permeated $CH_4$ concentration)/(supplied $CO_2$ concentration/supplied $CH_4$ concentration)".

TABLE 2

| | | Removal of structure directing agent | Repaired portion | Before repair | | After repair | |
|---|---|---|---|---|---|---|---|
| | Separation membrane | | | Separation coefficient | Permeation amount (L/min · m²) | Separation coefficient | Permeation amount (L/min · m²) |
| Example 2 | DDR membrane | After | MFI | 61 | 81 | 257 | 79 |
| Example 3 | DDR membrane | After | BEA | 155 | 92 | 220 | 91 |

In Example 2, the separation coefficient after the repair has improved as compared with that before the repair, and hence it was judged that defect portions 37 were repaired. As a result of SEM observation, it was confirmed that the MFI type zeolite was not deposited on the DDR membrane but was deposited only in the defect portions 37. In addition, from the result of EDS, the MFI type zeolite at repaired portions 34 had a ratio of $SiO_2/Al_2O_3$=1000. The percentage of the zeolite repaired portions 34 to the zeolite separation membrane 33 was 16% in terms of mass ratio.

In Example 3, the separation coefficient after the repair has improved as compared with that before the repair, and hence it was judged that defect portions 37 were repaired. As a result of SEM observation, it was confirmed that the BEA type zeolite was not deposited on the DDR membrane but was deposited only in the defect portions 37. In addition, from the result of EDS, the BEA type zeolite at repaired portions 34 had a ratio of $SiO_2/Al_2O_3$=150. The percentage of the zeolite repaired portions 34 to the zeolite separation membrane 33 was 7% in terms of mass ratio.

Example 4

The procedure of Example 1 was repeated to perform (1) preparation of substrate (porous body).

(2) Formation of MFI Membrane

As a separation membrane 33, an MFI membrane was formed on the inner wall faces 4s of cells 4 of the porous body 9.

(2-1) Preparation of Seeding Sol 36.17 g of 40 mass % tetrapropylammonium hydroxide solution (manufactured by SACHEM Co., Ltd.) and 18.88 g of tetrapropylammonium bromide (manufactured by Wako Pure Chemical Industries, Ltd.) were mixed, and further, 82.54 g of distilled water and 95 g of about 30 mass % silica sol (trade name: Snowtex S manufactured by Nissan Chemical Industries, Ltd.) were added and stirred with a magnetic stirrer at room temperature for 30 minutes, to prepare a seeding slurry liquid (slurry 64).

(2-2) Generation of Zeolite Seed Crystals

As shown in FIG. 4, the obtained seeding slurry liquid (slurry 64) was placed in a 300 ml pressure-resistant container which was made of stainless steel and in which an inner tube made of fluororesin was disposed, and the cylindrical porous body 9 having a diameter of 12 mm, a thickness of 1 to 2 mm and a length of 160 mm was immersed, and reacted at 110° C. in a hot air drier for 10 hours. The support after reaction was dried at 80° C. for 16 hours after 5 times of boiling washing. When the surface of the support after reaction was observed with a scanning type electron microscope (SEM), the whole surface of the porous body 9 was covered with zeolite crystal particles of about 0.5 μm. Furthermore, by X-ray diffraction of the crystal particles, an MFI type zeolite was identified.

(2-3) Preparation of Membrane Forming Sol 0.66 g of 40 mass % tetrapropylammonium hydroxide solution (manufactured by SACHEM Co., Ltd.) and 0.34 g of tetrapropylammonium bromide (manufactured by Wako Pure Chemical Industries, Ltd.) were mixed, and further, 229.6 g of distilled water and 5.2 g of about 30 mass % silica sol (trade name: Snowtex S manufactured by Nissan Chemical Industries, Ltd.) were added and stirred with a magnetic stirrer at room temperature for 30 minutes, to prepare a membrane forming sol.

(2-4) Formation of Zeolite Separation Membrane

The obtained membrane forming sol was placed in a 300 ml pressure-resistant container which was made of stainless steel and in which an inner tube made of fluororesin was disposed, and the porous body 9, in which the zeolite seed crystals 36 mentioned above were deposited, was immersed and reacted at 180° C. in a hot air drier for 60 hours. The porous body 9 after reaction was dried at 80° C. for 16 hours after 5 times of boiling washing. When a cross section of a surface portion of the porous body 9 after reaction was observed with a scanning type electron microscope (SEM), a dense layer (zeolite separation membrane) having a thickness of about 13 μm was formed on the surface of the porous body 9. When this dense layer was analyzed by X-ray diffraction (XRD), MFI type zeolite crystals were identified.

(2-5) Structure Directing Agent Removal

The obtained MFI type zeolite membrane formed on the porous body 9 was subjected to a temperature rise up to 500° C. in an electric furnace and held for 4 hours to remove tetrapropylammonium, thereby obtaining the zeolite membrane.

The ratio of $SiO_2/Al_2O_3$ was obtained by oxide conversion of the element ratio measured by EDS (energy dispersive X-ray spectroscopy). The value of the MFI membrane was $SiO_2/Al_2O_3=1000$. The adhered amount of the MFI membrane was 30 g/m$^2$.

(3) Repair of Zeolite Separation Membrane

In Example 4, the MFI membrane after removal of structure directing agent was repaired with SGT (before removal of structure directing agent). Hereinafter, description will specifically be made.

(SGT (the Number of Oxygen Atoms: 6) Repair)

7.35 g of ethylenediamine (manufactured by Wako Pure Chemical Industries, Ltd.) was placed in a 100 ml wide-mouthed bottle made of fluororesin, and then 1.156 g of 1-adamantaneamine (manufactured by Aldrich Co.) was added and dissolved so that precipitate of 1-adamantaneamine does not remain. 98.0 g of 30 mass % colloidal silica (trade name: Snowtex S manufactured by Nissan Chemical Industries, Ltd.) and 116.55 g of ion exchanged water were placed in another container and lightly stirred. Afterward, this was added to the wide-mouthed bottle in which ethylenediamine and 1-adamantaneamine were mixed, and strongly shaken to prepare a raw material solution. Molar ratios of the respective components of the raw material solution were 1-adamantaneamine/$SiO_2$=0.016 and water/$SiO_2$=21. Afterward, the wide-mouthed bottle containing the raw material solution was set to a homogenizer and stirring has been performed for 1 hour. The prepared raw material solution (sol 67) was placed in a stainless steel pressure-resistant container 65 with an inner tube having an inner capacity of 300 ml and made of fluororesin, the separation membrane structure 1 in which the MFI membrane was disposed was immersed, and a heating treatment (hydrothermal synthesis) was performed at 160° C. for 24 hours. After 5 times of boiling washing (washing operations), drying was performed at 100° C. for 16 hours. The adhered amount of SGT for repair was 5.9 g/m$^2$.

(4) Repair Evaluation of Zeolite Separation Membrane after Removal of Structure Directing Agent (Example 4) (Pervaporation Test)

Figure 7:
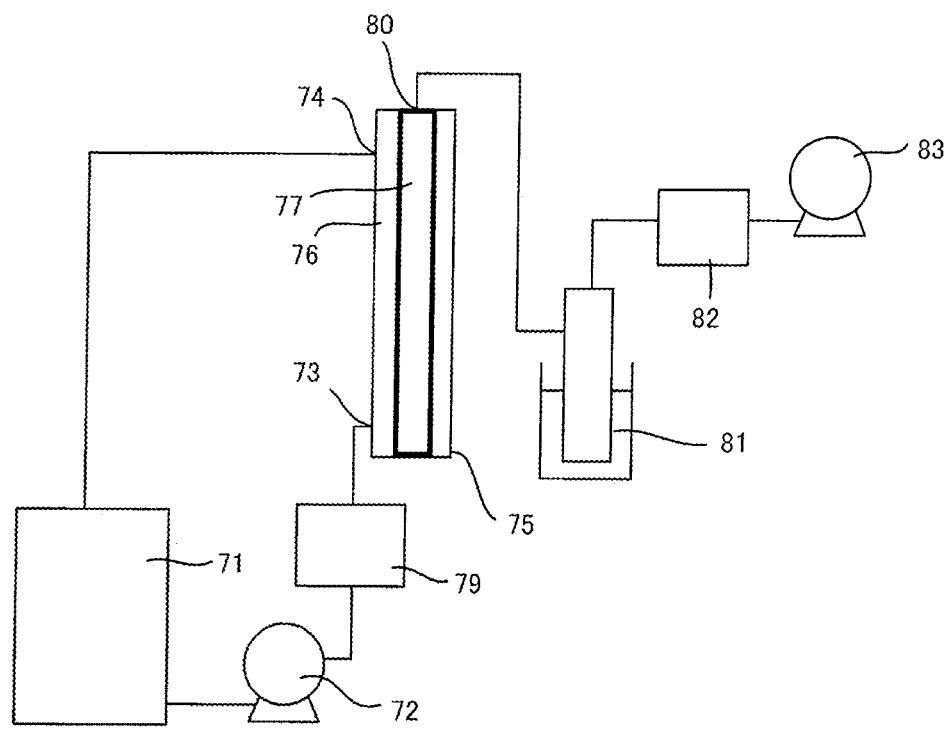
FIG. 7 is a schematic view showing the whole testing device to carry out a pervaporation test.

FIG. 7 is a schematic view showing the whole test device to carry out a pervaporation test. A module 75 made of SUS has a structure where the separation membrane structure 1 provided with the zeolite separation membrane 33 is mounted in a cylindrical outer container made of SUS. The inner space of the module 75 made of SUS is divided into a raw material side space 76 and a permeation side space 77 by the zeolite separation membrane 33. In addition, a supply liquid introducing port 73 and a supply liquid discharge port 74 are formed to communicate with the raw material side space 76. Furthermore, in an upper end portion of the permeation side space 77, a permeated vapor collection port 80 to discharge permeated vapor to the outside is formed.

An aqueous solution including 10 vol % ethanol placed in a raw material tank 71 was heated to about 70° C. A raw material was supplied to the raw material side space 76 of the module 75 made of SUS (stainless steel) from the supply liquid introducing port 73 by a supply pump 72 and the raw material discharged from the supply liquid discharge port 74 was returned to the raw material tank 71, thereby circulating the raw material. The flow rate of the raw material was checked with a flow meter 79.

The pressure of the support side (permeation side space 77) of the zeolite separation membrane 33 was reduced by a vacuum pump 83, thereby allowing permeation through the zeolite separation membrane 33, and the permeated vapor discharged from the permeated vapor collection port 80 was collected in a liquid $N_2$ trap 81. The vacuum degree of the permeation side space 77 was controlled by a pressure controller 82.

The mass of the obtained liquid was weighed with an electronic balance and the composition of the liquid was analyzed by gas chromatography.

Table 3 shows the separation coefficient and the permeation amount (kg/min·m$^2$) obtained as a result of the above pervaporation test. Here, as shown in the following equation, the separation coefficient is a value of the ratio between ethanol concentration (vol %) and water concentration (vol %) in the permeated liquid to the ratio between ethanol concentration (vol %) and water concentration (vol %) in the supplied liquid. In addition, the permeation flux is a mass of all substances permeated in the separation membrane 33 per unit time (hour) and unit area (m$^2$).

Separation coefficient=((ethanol concentration in permeated liquid)/(water concentration in permeated liquid))/((ethanol concentration in supplied liquid)/(water concentration in supplied liquid))

TABLE 3

| | Separation membrane | Removal of structure directing agent | Repaired portion | Before repair | | After repair | |
|---|---|---|---|---|---|---|---|
| | | | | Separation coefficient | Permeation amount (kg/min·m$^2$) | Separation coefficient | Permeation amount (kg/min·m$^2$) |
| Example 4 | MFI membrane | After | SGT | 19.2 | 2.1 | 45.1 | 2.1 |

The separation coefficient after the repair has improved as compared with that before the repair, and hence it was judged that defect portions 37 were repaired. As a result of SEM observation, the SGT type zeolite was not deposited on the MFI membrane but was deposited only in the defect portions 37. In addition, according to EDS result, the SGT type zeolite at repaired portions 34 had a ratio of SiO$_2$/Al$_2$O$_3$=∞. The percentage of the zeolite repaired portions 34 to the zeolite separation membrane 33 was 17% in terms of mass ratio.

INDUSTRIAL APPLICABILITY

The repair method of ceramic separation membrane structure of the present invention can be used in repair of defects of the ceramic separation membrane structure in which zeolite separation membrane is formed on the inner wall faces of the cells. The ceramic separation membrane structure of the present invention can be used in separation of mixed gases or mixed liquids.

DESCRIPTION OF REFERENCE NUMERALS

1: separation membrane structure, 1s: sealing portion, 2, 2a and 2b: end face, 3: partition wall, 4: cell, 4s: inner wall face, 6: circumferential face, 9: porous body, 30: substrate, 33: separation membrane, 34: zeolite repaired portion, 36: seed crystal, 37: defect portion, 51: housing, 52: fluid inlet, 53 and 58: fluid outlet, 54: sealing member, 62: wide-mouthed funnel, 63: cock, 64: slurry, 65: pressure-resistant container, 67: sol, 68: drier, 71: raw material tank, 72: supply pump, 73: supply liquid introducing port, 74: supply liquid discharge port, 75: module made of SUS, 76: raw material side space, 77: permeation side space, 79: flow meter, 80: permeated vapor collection port, 81: liquid N$_2$ trap, 82: pressure controller, and 83: vacuum pump.

What is claimed is:

1. A ceramic separation membrane structure including: a ceramic porous body; a zeolite separation membrane disposed on the ceramic porous body; and at least one zeolite repaired portion containing zeolite of structure different from a structure of zeolite of the zeolite separation membrane deposited only in defect portions which are not covered with the zeolite separation membrane and where the surface of the ceramic porous body is exposed, wherein the zeolite separation membrane and the zeolite repaired portion are made of a hydrophobic zeolite having an SiO$_2$/Al$_2$O$_3$ molar ratio of 100 or more, and wherein in the zeolite of the zeolite repaired portion, the number of oxygen atoms included in each ring structure is smaller than, equal to, or 1 to 4 larger than the number of oxygen atoms included in each ring structure of the zeolite of the zeolite separation membrane.

2. The ceramic separation membrane structure according to claim 1, wherein a percentage of the zeolite repaired portion to the zeolite separation membrane is 20% or less in terms of mass ratio.

3. The ceramic separation membrane structure according to claim 1, wherein the ceramic porous body has a monolith shape.

4. The ceramic separation membrane structure according to claim 1, wherein the zeolite of the zeolite separation membrane is of a DDR type, and the zeolite of the zeolite repaired portion is of an MFI type.

5. A repair method of a ceramic separation membrane structure, in which a zeolite separation membrane is disposed on a ceramic porous body, the zeolite separation membrane having at least one defect through which a portion of the ceramic porous body is exposed and then at least one zeolite repaired portion containing zeolite of structure different from a structure of zeolite of the zeolite separation membrane is formed only on the exposed portion of the ceramic porous body, wherein in the zeolite of the zeolite repaired portion, the number of oxygen atoms included in each ring structure is smaller than, equal to, or 1 to 4 larger than the number of oxygen atoms included in each ring structure of the zeolite of the zeolite separation membrane.

6. The repair method of the ceramic separation membrane structure according to claim 5, wherein the zeolite separation membrane and the zeolite repaired portion are made of a hydrophobic zeolite having an SiO$_2$/Al$_2$O$_3$ molar ratio of 100 or more.

7. The repair method of the ceramic separation membrane structure according to claim 5, wherein a repairing sol to form the zeolite of the structure different from the structure of zeolite of the zeolite separation membrane is prepared, and the ceramic porous body on which the zeolite separation membrane is disposed is immersed into the repairing sol, and a heating treatment is performed to form the at least one zeolite repaired portion.

8. The repair method of the ceramic separation membrane structure according to claim 5, wherein the zeolite separation membrane before repair includes a structure directing agent, and the at least one zeolite repaired portion is formed before or after the structure directing agent is removed.

9. The repair method of the ceramic separation membrane structure according to claim 8, wherein the at least one zeolite repaired portion also includes a structure directing agent that is different from the structure directing agent of the zeolite separation membrane.

* * * * *